United States Patent [19]

Loggins, Jr. et al.

[11] 4,221,574
[45] Sep. 9, 1980

[54] APPARATUS FOR REMOVING PARTICULATES FROM THE EXHAUST GASES GENERATED IN DRUM MIXERS AND AGGREGATE DRYERS

[75] Inventors: Ted C. Loggins, Jr.; Jerry Kraim, both of Los Angeles, Calif.

[73] Assignee: Allis-Chalmers Corporation, Milwaukee, Wis.

[21] Appl. No.: 32,291

[22] Filed: Apr. 23, 1979

[51] Int. Cl.² .......................................... B01D 47/06
[52] U.S. Cl. ...................... 55/238; 55/394; 55/418; 55/426; 55/430; 261/79 A
[58] Field of Search ............ 55/226, 235, 236–238, 55/257 MP, 392, 393, 394, 418, 426, 430, 466; 261/79 A

[56] References Cited

U.S. PATENT DOCUMENTS

| | | | |
|---|---|---|---|
| 2,289,474 | 7/1942 | Anderson | 55/393 |
| 3,093,468 | 6/1963 | Krochta | 55/238 |
| 3,274,757 | 9/1966 | Wapler | 55/238 |
| 3,304,695 | 2/1967 | Krochta | 55/238 |
| 3,372,532 | 3/1968 | Campbell | 55/426 |
| 3,944,402 | 3/1976 | Cheremisinoff | 55/238 |
| 3,990,870 | 11/1976 | Miczek | 55/226 |
| 4,157,903 | 6/1979 | Kanda et al. | 55/393 |

OTHER PUBLICATIONS

Lea Flash Reactor-Contactor, Rhône-Poulenc, Ateliers de Constructions Mécaniques et Chaudronnerie, F. Aoustin & Cie, 1/11/1977.

Primary Examiner—David L. Lacey
Attorney, Agent, or Firm—Robert C. Jones

[57] ABSTRACT

A wet type gas scrubber is disclosed and utilizes a ring dam or deflector ring around the periphery of the scrubber's inner tube to intercept and restrain the particulate Laden water as it flows along the outer surface of the inner tube. The deflector prevents the particulate Laden water from entering into the gas exhaust flow that is being emitted to atmosphere. The scrubber includes damper means in the gas inlet for regulating the velocity of gas through the inlet.

5 Claims, 5 Drawing Figures

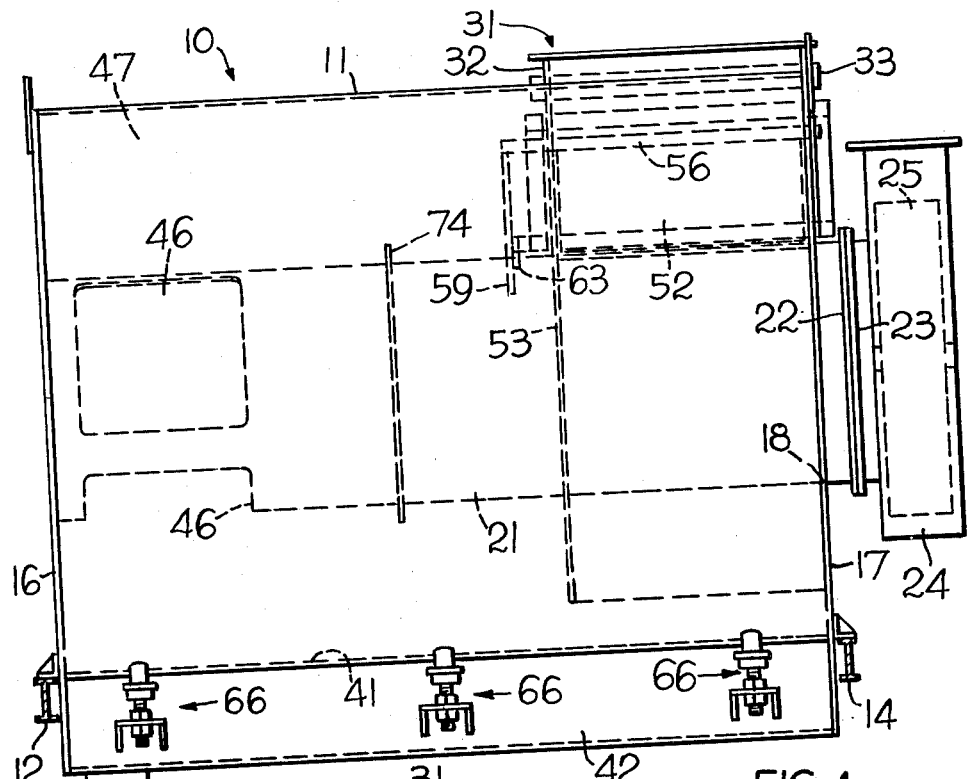
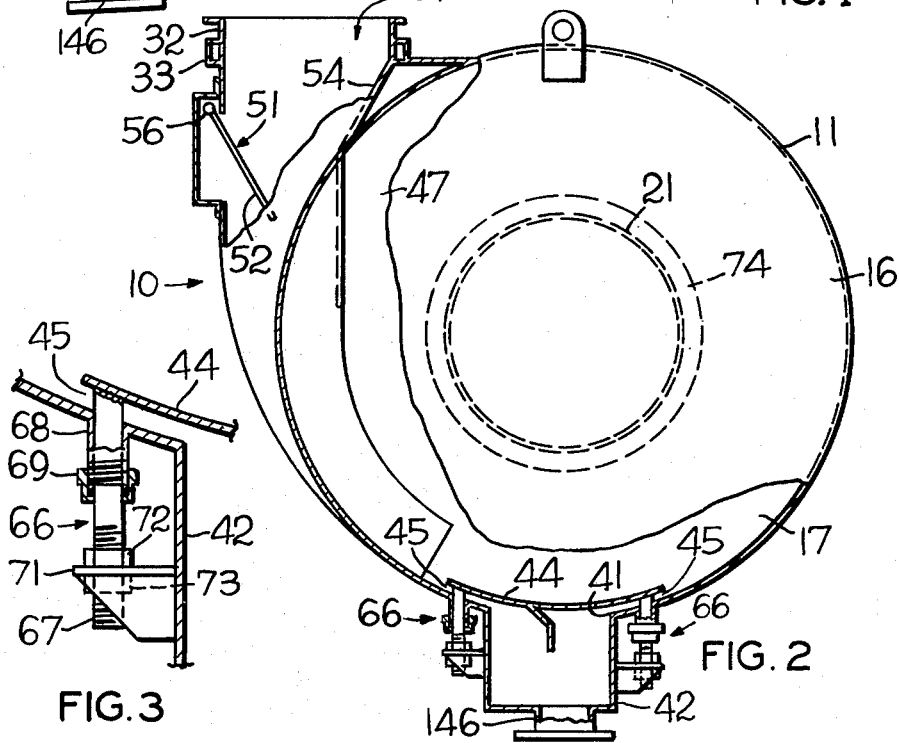

APPARATUS FOR REMOVING PARTICULATES FROM THE EXHAUST GASES GENERATED IN DRUM MIXERS AND AGGREGATE DRYERS

FIELD OF THE INVENTION

This invention relates to gas scrubbing apparatus such as is employed with asphalt drum mixing apparatus or aggregate drying apparatus; and is more particularly concerned with means for preventing particulate laden water from entering the gas stream which is being vented to atmosphere.

BACKGROUND OF THE PRIOR ART

It has come to be recognized that substantial economies can be achieved in the repair and reconstruction of asphalt pavements if crushed salvaged asphalt material, reclaimed from a previously laid pavement, is mixed with virgin (unused) aggregate. The mixing of asphalt materials and the introduction of salvaged asphalt materials generate a considerable amount of particulates which are carried along in the gases which are being exhausted to atmosphere. Environmental requirements demand that these exhaust gases be treated so as to remove the major amount of particulates from the gases before they are exhausted.

One approach to this problem is disclosed in U.S. Pat. No. 3,693,945 wherein a spray mechanism is provided to spray hot bituminous liquid onto the aggregate passing through the cylinder mixer. This bituminous spray was intended to also coat the particles moving with the exhaust gases and thence would fall out of the exhaust gases. In another version there is suggested that the dust ladened gases are back flushed through the mixer and into a centrifuge separator where the heavier dust particles are retained. The gases and entrained lighter dust are then directed into an air washer and hot bituminous liquid utilized to coat the dust. As is apparent, this apparatus was very expensive, requiring additional equipment for dust removal.

In U.S. Pat. No. 3,840,215, another system is disclosed for handling the dust problem in asphalt mixing plants. As shown, dust knock-out boxes are provided which are distinct and separate from the mixing apparatus itself. Ducts from the mixing apparatus are connected to the knock-out boxes directing the dust laden gases from the mixing apparatus into the boxes. Within the knock-out boxes a baffle is provided to provide a circuitous gas flow path through the boxes. These baffles are supposed to interrupt the air flow causing the dust and solid particles to drop out of the gases and into a collecting drawer.

In U.S. Pat. No. 4,034,968, there is disclosed apparatus in the form of an accumulator collar to prevent the venting of hydrocarbons into the atmosphere. The collar is hollow and extends around the upper mixing drum exterior covering outlet ports through which the mixed asphalt exits from the drum. A pipe which communicates between the collar and the furnace and creates a draft through the pipe to assist in pulling gases from the collar into the furnace chamber. Thus, the gases are recirculated in a manner similar to the internal combustion engine of the present day automobile.

By contrast with respect to the prior art, the general object of the present invention is to provide a scrubber apparatus operable to treat particulate laden gases from an asphalt drum mixer (or aggregate dryer) to remove the dust therefrom prior to the gases being exhausted to atmosphere.

Another object of the present invention is to provide a gas scrubber for cleaning the exhaust gases from an asphalt drum mixing apparatus, or aggregate dryer.

Still another object of the present invention is to provide a gas scrubber for cleaning particulate from the exhaust gases of an asphalt drum mixing apparatus or aggregate dryer which has no moving parts.

Yet another object of the present invention is to provide a wet gas scrubber for cleaning the particulates from the exhaust gases of an asphalt drum mixing apparatus, or aggregate dryer.

A further object of the present invention is to provide a gas scrubber having a ring dam to prevent particulate laden water from entering the exhaust gas stream from a surface of the scrubber system.

SUMMARY OF THE INVENTION

A wet type gas scrubber is disclosed having no moving parts and utilizes a ring dam or deflector ring around the periphery of the scrubber's inner tube to intercept and restrain the particulate laden water as it flows along the outer surface of the inner tube. The deflector prevents the particulate laden water from entering into the gas exhaust flow that is being emitted to atmosphere.

DESCRIPTION OF THE DRAWINGS

FIG. 1 is a view in side elevation of the scrubber incorporating the present invention;

FIG. 2 is an end view of the scrubber as viewed from the left end in FIG. 1;

FIG. 3 is an enlarged view of one of the adjusters for the slicer plate;

DESCRIPTION OF THE INVENTION

Figure 4:
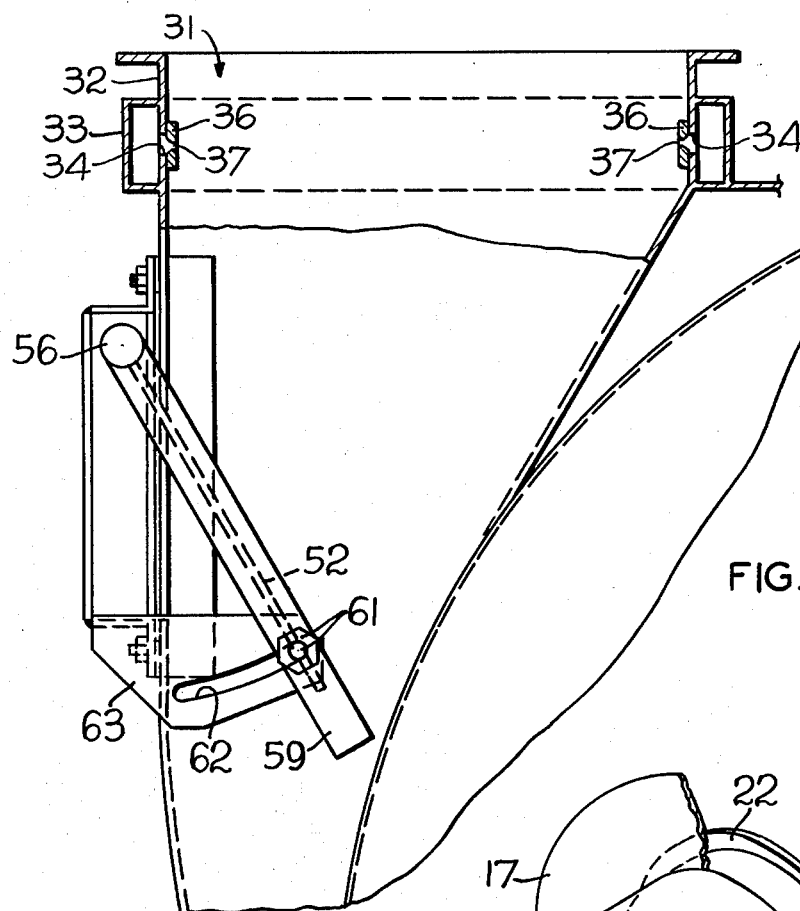
FIG. 4 is an enlarged view of the upper portion of the gas inlet showing the damper and spray orifice construction; and, FIG. 5 is an enlarged view of the inner exhaust tube of the scrubber shown in FIG. 1.

Referring to the accompanying drawings wherein a scrubber 10 which incorporates the present invention is shown. The scrubber 10 comprises a cylindrical body portion 11 supported on beam members 12 and 14 which may be carried on a mobile unit (not shown) if so desired. The left end of the cylindrical body 11, as seen in FIG. 1, is closed by an end plate 16 and is secured thereto as by welding. The right hand end of the cylindrical body portion 11 is also sealed by an end plate 17 which is likewise welded to the end of the body portion. The end plate 17 is provided with a circular axial opening 18 through which an inner tube 21 is inserted into the cylindrical body portion 11. As shown, the inner tube 21 is sufficiently long enough so that it will abut the inner surface of the end plate 16. The end of the tube 21 which abuts the end plate 16 is welded to the plate so as to firmly hold the end in its operative position. The opposite or right hand end of the inner tube 21, as viewed in FIG. 1, extends outwardly of and away from the outer surface of the end plate 17.

The extending right end of the inner tube 21 is provided with a flange 22 which is adapted to mate with a flange 23 of an exhaust fan housing 24.

An enclosed tangentential gas inlet 31 merges into the cylindrical housing 11 so as to provide a smooth transitional flow path into the interior of the housing. Around the external end 32 of the gas inlet 31 there is provided a water manifold 33. The neck or external end 32 of the gas inlet 31 is provided with slotted openings 34. A pair of orifice plates 36 having a plurality of spaced orifices 37 therein is welded to the inner surface of the external end 32 of the inlet 31 so as to provide a mist to the inflowing exhaust gases.

At the bottom of the cylindrical body portion 11, as viewed in FIGS. 1 and 2, the cylindrical shell 11 is interrupted so as to provide a longitudinal opening 41. A formed longitudinally extending trough 42 is welded to the edges of the cylindrical body portion 11 which define the opening 41.

As previously mentioned, the fan 25 within the fan housing 24 operates to draw the particulate laden exhaust gases into the scrubber through the gas inlet 31. To this end, the inner end of the inner tube 21 is provided with a plurality of windows or ports 46. The ports 46 operate to provide communication between the chamber 47 defined by the interior of the cylindrical shell 11 and the external surface of the inner tube 21. As the exhaust gases are drawn into the chamber 47 by operation of the exhaust fan 25, the gases swirl around the chamber 47 moving downwardly towards the lower left hand end of the cylindrical shell. The gases are drawn into the core of the inner tube 21 through the ports 46 and exhaust out through the fan housing 24.

To scrub the exhaust gases to remove the particulates therefrom prior to the gases being exhausted to atmosphere, it has been found advantageous to spray the particulate laden gases with a liquid mist which herein is described as being water. This is accomplished by water flow through the orifices 37.

To control the velocity of the gases that are being pulled through the chamber 47 and to create a turbulence for effectively mixing the particulates with the entire volume of gases, there is provided a damper 51 disposed so as to operate within the inlet end 32 of gas inlet 31. As shown in FIG. 2, the damper 51 comprises a plate 52 which is closely fitted within the end plate 17 which forms one side of the gas inlet 31 and an opposite plate 53 which forms the opposite side of the inlet 31. The damper plate 52 is adapted to be selectively positioned between open and closed positions. In the partially closed position, as shown in FIG. 2, the damper plate cooperates with a throat plate 54 to effectively restrict the opening in the inlet 31. To effect the pivotal movement of the damper plate 52, the plate is provided with a laterally extending shaft or pin 56. The stub shaft 56 is journalled in the side walls of a box-like extension welded to the inlet side shown in FIG. 2. To effect selective pivotal movement of the damper, an operating lever 59 is provided. The lever 59 is secured to the extending end of shaft 56 and is external with respect to the inlet 31. Towards the lower end of the lever 59, there is provided a threaded bolt and nut arrangement 61 which cooperates with an arcuate slot 62 formed in a vertical plate 63 that is attached to the side of the inlet. Thus, movement of lever 59 will effectively move the damper 52 to a desired setting for regulating the velocity of the gases through the inlet 31. By tightening the bolt and nut 61, the damper can be secured in the selected position.

The moisture laden gases and slurry stream enter the chamber 47, tangentially, and move toward the bottom. The centrifugal force resulting from the entering tangential velocity causes the moisture laden gases and the slurry stream to travel along the inner surface of the chamber 47. A longitudinally extending vertically adjustable slicer plate 44 operates to remove from the slurry stream the major portion of slurry and to collect it in the trough 42. The remaining slurry swirls around along the inner surface of the chamber 47 and eventually enters underneath the slicer plate 44 and is collected in the trough 42. The slicer plate 44 is constructed and arranged so as to be adjustable with respect to the longitudinal opening 41 to thereby establish the spacing of the opening 45 through which the slurry spills into the trough 42. An outlet 146 is provided for emptying the trough 42. To effect the vertical adjustment of the slicer plate 44, there is provided a plurality of adjusters 66. The adjusters are disposed on each of the longitudinal sides of the slicer plate 44. The adjusters 66 are identical and, as shown in FIGS. 2 and 3, comprise a depending stud 67 which is welded to the slicer plate 44. The stud 67 extends through a suitable opening formed in the cylindrical wall of the scrubber and extends through tubular housing 68 welded to the scrubber surface. Surrounding the stud 67 is a packing cap 69 which is threaded on the depending end of the tubular housing 68. This arrangement prevents air or water leakage between the stud 67 and the housing 68. The lower end of the stud is threaded and passes through a horizontally extending bracket 71 that is welded to the side of the trough 42. A pair of jam nuts 72 and 73 are threaded on the stud and are disposed on either side of the bracket 71 as shown. Thus, by adjusting the jam nuts 72 and 73, the slicer plate 44 may be raised or lowered as desired.

Figure 5:
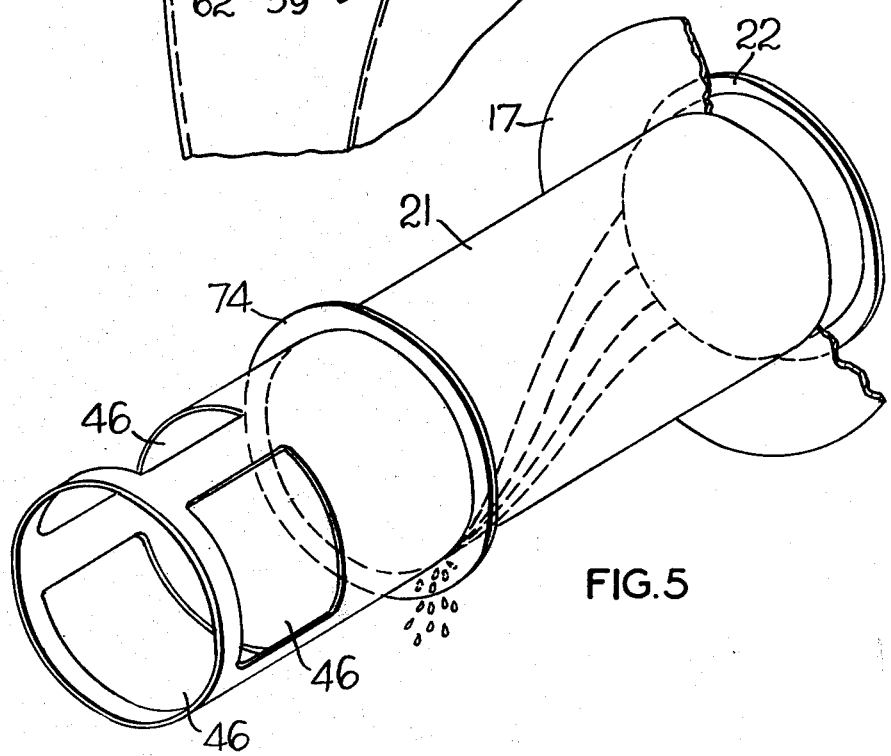

A small portion of the slurry is forced up the inner surface of the end plate 17 by the action of the fast moving gas stream. This slurry flows out and along the outer surface of the inner tube 21 in a spiral flow path as indicated in FIG. 5. This flow of slurry along the inner tube 21 will be drawn into the windows or ports 46 and join the exhaust gases being expelled into the atmosphere. The amount of particulates entrained in the slurry that is expelled into the atmosphere exceeds the environmental limits and cannot be tolerated. To prevent the slurry from being drawn along the tube and into the ports 46, it has been discovered that a deflector ring 74 placed around the tube 21 is extremely effective for this purpose. The slurry moving along the surface of the inner tube runs against the deflector ring 74 and is deflected away from the inner tube by gravity and air movement. When the build-up of slurry on the face of the deflector ring becomes sufficiently large, it falls away into the revolving air stream and is carried to the inner surface of the cylindrical shell 11 by centrifugal force. This slurry is also washed into the trough 42. It is apparent that the particulate laden gases are scrubbed with substantially all of the particulates removed therefrom prior to the gases being exhausted to atmosphere by operation of the present invention. It is also apparent that the scrubber herein disclosed is relatively inexpensive to manufacture contains no moving components other than the damper and thus is reliable and requires little or no maintenance.

The embodiments of the invention in which an exclusive property or privilege is claimed are defined as follows:

1. In a scrubber for cleaning particulate laden gases comprising:
   an outer housing adapted to be carried on supporting structure and having an axis, said housing having closing end walls;

a tubular inner tube supported within said housing; having one end in abutting engagement with an end wall of said housing and having its opposite end extending through the opposite end wall;

said inner tube positioned with respect to the inner surface of said housing to define a chamber;

a plurality of ports formed in said inner tube to establish a communication means between said chamber and the core of said tubular inner tube;

a gas inlet communicating in tangential oriented relationship with the chamber in the interior of said housing;

moisturizing means for wetting the particulate carried by the gases entering through said gas inlet prior to the gas entering into said chamber;

an exhaust fan operably connected to the extending end of said inner tube and operable to draw gases supplied to the gas inlet through said chamber and through said ports and the core of said tubular inner tube to exhaust the gases therefrom;

a longitudinally extending sump at the bottom of said housing;

a longitudinally extending opening formed in the wall of said housing at the bottom thereof in position between said sump and said chamber to provide for communication therebetween;

an elongated control plate having an arcuate configuration which conforms to the curvature of the inner surface of said housing associated with said longitudinally extending opening, said control plate being positionable with respect to said longitudinal opening to regulate the amount of communication between the chamber and the sump;

adjusting means for effecting a positioning movement of said control plate to establish the desired communicating spacing between said sump and said chamber; and, a control means for regulating the velocity of the gases entering through said gas inlet into said chamber;

whereby said exhaust fan draws the moisturized gas through said chamber in a swirling path of travel around said inner tube and out through said core of said inner tube and the particulates by centrifugal force are carried to the inner surface of said housing and thence into said sump.

2. A scrubber according to claim 1 further comprising a deflector mounted on said inner tube so as to deflect the slurry flowing around said inner tube in a spiral path downwardly and away from said inner tube into the revolving gas stream and is carried by centrifugal force to the surface of said housing and flows by gravity and centrifugal gas movement along the surface into said sump.

3. A scrubber according to claim 2 wherein said deflector extends radially outwardly from the circumferential surface of said inner tube to form a dam to prevent liquid and/or slurry from flowing along said tube surface and into said ports.

4. A scrubber according to claim 3 wherein said deflector is a segment of a ring extending radially outwardly from the surface of said inner tube in a plane transverse to the axis of said tube.

5. A scrubber according to claim 4 wherein said deflector is a ring extending around said inner tube and radially outwardly thereof.

* * * * *